(12) United States Patent
Burton

(10) Patent No.: US 11,130,836 B2
(45) Date of Patent: Sep. 28, 2021

(54) CYCLOALIPHATIC CARBONATES AS REACTIVE DILUENTS IN EPOXY RESINS

(71) Applicant: Huntsman Petrochemical LLC, The Woodlands, TX (US)

(72) Inventor: Bruce L Burton, Spring, TX (US)

(73) Assignee: HUNTSMAN Petrochemical LLC, The Woodlands, TX (US)

( * ) Notice: Subject to any disclaimer, the term of this patent is extended or adjusted under 35 U.S.C. 154(b) by 121 days.

(21) Appl. No.: 15/364,801

(22) Filed: Nov. 30, 2016

(65) Prior Publication Data

US 2017/0081465 A1  Mar. 23, 2017

Related U.S. Application Data

(63) Continuation of application No. 13/583,255, filed as application No. PCT/US2011/026939 on Mar. 3, 2011, now abandoned.

(Continued)

(51) Int. Cl.
*C08G 59/68* (2006.01)
*C08G 59/32* (2006.01)
(Continued)

(52) U.S. Cl.
CPC .......... *C08G 59/68* (2013.01); *B29C 45/0001* (2013.01); *B29C 45/72* (2013.01); *C08G 59/22* (2013.01); *C08G 59/226* (2013.01); *C08G 59/245* (2013.01); *C08G 59/32* (2013.01); *C08G 59/50* (2013.01); *C08G 59/502* (2013.01); *C08G 59/5026* (2013.01); *C08G 65/2624* (2013.01); *C08J 5/00* (2013.01); *C08L 63/00* (2013.01); *F03D 13/10* (2016.05); *B29K 2063/00* (2013.01); *B29K 2105/0014* (2013.01); *B29K 2105/0047* (2013.01);
(Continued)

(58) Field of Classification Search
None
See application file for complete search history.

(56) References Cited

U.S. PATENT DOCUMENTS 2,847,342 A * 8/1958 Kohn .................... C08G 59/448
428/379
3,305,527 A * 2/1967 Price ....................... C08G 59/14
525/382

(Continued)

FOREIGN PATENT DOCUMENTS

EP      0 496 163 A     7/1992
EP      1 852 479 A     11/2007
(Continued)

*Primary Examiner* — Rachel Kahn
*Assistant Examiner* — Ha S Nguyen
(74) *Attorney, Agent, or Firm* — Huntsman Petrochemical LLC; Aleece M. Hayes

(57) ABSTRACT

Embodiments of the present invention disclose a method for limiting peak exotherm temperatures in epoxy systems comprising the step of: combining an amine hardener, an epoxy and a diluent to form an epoxy system, wherein the diluent is selected from the group consisting of: ethylene carbonate, propylene carbonate, butylene carbonate, delta-valerolactam, delta-valerolactone, gamma valerolactone, butyrolactam, beta butyrolactone, gamma butyrolactone, and combinations thereof.

9 Claims, 1 Drawing Sheet

Related U.S. Application Data

(60) Provisional application No. 61/312,924, filed on Mar. 11, 2010.

(51) Int. Cl.
*C08G 59/50* (2006.01)
*C08L 63/00* (2006.01)
*F03D 13/10* (2016.01)
*B29C 45/00* (2006.01)
*B29C 45/72* (2006.01)
*C08G 59/22* (2006.01)
*C08G 59/24* (2006.01)
*C08J 5/00* (2006.01)
*C08G 65/26* (2006.01)
*B29K 63/00* (2006.01)
*B29K 105/00* (2006.01)
*B29L 31/08* (2006.01)

(52) U.S. Cl.
CPC .... *B29L 2031/085* (2013.01); *C08G 2120/00* (2013.01); *C08J 2363/02* (2013.01); *F05B 2230/30* (2013.01)

(56) References Cited

U.S. PATENT DOCUMENTS

| | | | |
|---|---|---|---|
| 4,189,564 A | | 2/1980 | Waddill |
| 4,269,879 A | * | 5/1981 | Davis .................... C08G 59/50 |
| | | | 427/386 |
| 7,049,387 B2 | | 5/2006 | Dupre, Jr. |
| 2005/0234216 A1 | * | 10/2005 | Klein .................... C08G 59/18 |
| | | | 528/422 |
| 2008/0003369 A1 | | 1/2008 | Uenishi et al. |
| 2008/0197526 A1 | | 8/2008 | Shafi |
| 2008/0200589 A1 | * | 8/2008 | Hubschmid ............ C08L 53/00 |
| | | | 523/436 |
| 2008/0299395 A1 | | 12/2008 | Strange et al. |
| 2009/0280709 A1 | | 11/2009 | Rukavina et al. |

FOREIGN PATENT DOCUMENTS

| | | | | |
|---|---|---|---|---|
| EP | 1 848 754 A | | 6/2008 | |
| WO | WO-2008103868 A1 | * | 8/2008 | ........... C08G 59/686 |

\* cited by examiner

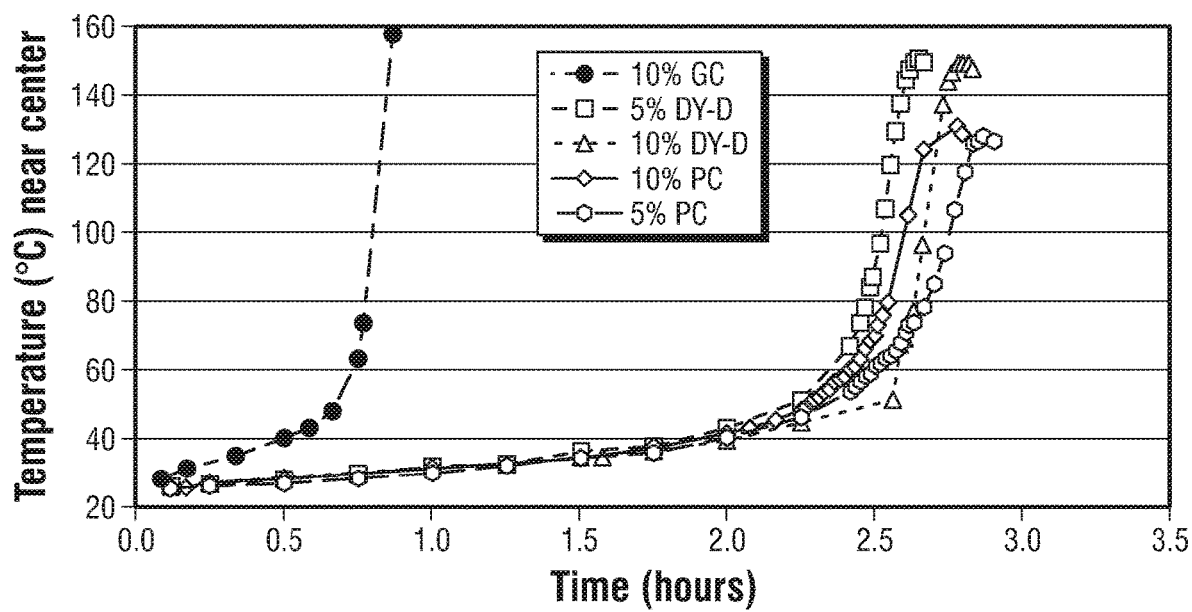

CYCLOALIPHATIC CARBONATES AS REACTIVE DILUENTS IN EPOXY RESINS

CROSS-REFERENCE TO RELATED APPLICATIONS

This application claims the benefit of U.S. patent application Ser. No. 13/583,255, filed Sep. 21, 2012, currently pending, and U.S. Pat. App. Ser. No. 61/312,924, filed Mar. 11, 2010, the entire disclosures of which are incorporated herein by reference.

STATEMENT REGARDING FEDERALLY SPONSORED RESEARCH OR DEVELOPMENT

Not applicable.

FIELD OF THE INVENTION

The present invention relates generally to methods of producing epoxy resin systems and more particularly to the use of cycloaliphatic carbonates as reactive diluents in epoxy resin systems.

BACKGROUND

Formulators of epoxy resin systems have long used various means for reducing the viscosity of formulations in order to effectively utilize the performance benefits ascribable to cured epoxy resins, relative to other available chemistries. For many epoxy resin applications, low viscosities provide desired benefits such as improvements in 1) mixing, 2) wetting (of surfaces, fillers, fibers, etc), 3) crack injection, 4) application (e.g. by roller, trowel, spray, etc.), and 5) infusion (e.g. for porous structure consolidation, preforms for composites, etc.).

Lower molecular weight, lower viscosity compounds, termed "diluents," are commonly added to epoxy formulations, commonly on the epoxy resin side of two-part formulations, for viscosity reduction. Diluents that polymerize into the system, known as reactive diluents, are preferred over the use of non-reactive diluents, since mechanical and thermal property reductions in the cured resin are less severe for reactive diluents. Property reductions become greater as diluent levels are increased, thus there is often a trade-off between achieving the desired low viscosity and maintaining the required properties in the cured resin. For this reason, decreasing viscosity while minimizing the level of diluent used is an ongoing goal as formulators simultaneously search for diluents having either greater efficiency or show lower property reduction.

One relatively simple viscosity reduction method is heating the epoxy resin and hardener. This method is of limited utility in some cases since the heat increases the polymerization rate and unacceptably shortens the available processing time. Also, the higher initial temperatures of the reactants lead to higher exotherm temperatures that may exceed allowable limits Too high of an exotherm temperature can lead to a variety of problems. In such applications where the mass of the reactive epoxy mixtures is great enough that the heat of reaction raises the temperature excessively, problems can arise from a variety of causes such as 1) thermal expansion of the components, 2) expansion of entrained gases, 3) volatilization of lower boiling components, 4) thermal degradation of the material (particularly in the thickest sections which become hottest), 5) sagging, 6) cycle time lengthening (e.g. due to needed cooling to attain rigidity for de-molding), 7) added thermal load in buildings where manufacturing is being done, etc. Thus, ways of decreasing the peak exotherm temperature of epoxy formulations are of benefit in may circumstances.

Decreasing the peak exotherm temperature could be done in a variety of ways, such as: 1) pre-cooling of components, 2) incorporation of phase change materials, 3) direct cooling during polymerization, 4) substitution of reactants having lower reactivity, 5) addition of fillers (in greater quantity and/or of higher heat capacity or thermal conductivity), etc. For certain applications several of these means of exotherm reduction are unacceptable. For instance, pre-cooling of components may raise viscosity and prevent good mixing, wetting, mold-filling, etc. Phase change materials may be expensive, chemically reactive, soluble once liquid, change at non-optimum temperatures, etc. Direct cooling is poorly effective in the thickest regions and may create additional residual stresses due to thermal expansion mismatches between components. Components having lower reactivity are also typically slower curing and require additional heat for full polymerization, thus they create a need for longer cycle times or higher bake temperatures. Filler incorporation greatly affects the mechanical properties and thus may be specified and fixed. Additionally, though higher filler levels decrease exotherm temperatures, there are practical upper limits of use level, based on both processing and performance, which cannot be exceeded.

Reactive diluents have long enabled the use of epoxy formulations in new applications or as a way of achieving processing improvements in existing applications. In the case of amine-cured epoxy resin systems, such diluents have included low molecular weight epoxies, low molecular weight compounds with reactive unsaturation (such as acrylates), lactones, and cycloaliphatic carbonates (U.S. Pat. No. 3,305,527; Feb. 21, 1967), among others. Of these, low molecular weight epoxies and acrylates are known to have adverse health effects on some people exposed to them. Aromatic glycidyl ethers, such as phenyl glycidyl ether, are particularly known for causing allergic sensitization.

Additionally, in some applications, such as the molding of large composite wind blades, decreasing or eliminating the use of common epoxy diluents (such as the diglycidyl ether of 1,4-butane diol) is beneficial to the thermal and mechanical properties of the cured resin but some minimum use level is necessary since viscosity reduction via heating is limited by the increase in maximum exotherm temperature that occurs when the temperatures of the reactive components are raised.

BRIEF SUMMARY OF SOME OF THE PREFERRED EMBODIMENTS

A diluent that reduces the maximum exotherm temperature caused by the epoxy resin polymerization reaction would be of particular utility since it would allow one to increase the temperature of the reactants prior to blending. The ability to use higher resin formulation component temperatures reduces the need for diluents. Thus using a diluent that reduces the maximum exotherm temperature allows one to decrease the component viscosities by increasing the temperature(s) of the resin and hardener. At the same time this decreases the need for diluent, allowing a reduction in diluent level that improves the properties of the cured resin system, in particular by increasing the cured glass transition temperature.

Embodiments of the present invention disclose a method for limiting peak exotherm temperatures in epoxy systems comprising the steps of: combining an amine hardener, an epoxy and a diluent to form an epoxy system, wherein the diluent is selected from the group consisting of: ethylene carbonate, propylene carbonate, butylene carbonate, delta-valerolactam, delta-valerolactone, gamma valerolactone, butyrolactam, beta butyrolactone, gamma butyrolactone, and combinations thereof.

Embodiments of the present invention disclose an article of manufacture, such as a composite rotor blade for use in wind turbines, also termed a wind blade, produced by the method described above.

Embodiments of the present invention further disclose the use of the method described above for producing a molded epoxy composite article.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

The following FIGURE has been added to further clarify properties of the present invention.

FIG. 1 shows the temperature rise during gel time testing.

DETAILED DESCRIPTION OF THE PREFERRED EMBODIMENTS

The present invention relates to cycloaliphatic carbonates as reactive diluents in epoxy resins for decreasing the exotherm temperature of cast epoxy formulations, thus allowing an increase in the temperature(s) of the initial components. The ability to increase the initial component temperature(s) while avoiding degradation and other ill-effects caused by too-high exotherm temperature(s) provides a significant further viscosity reduction and the benefits that such a reduction provides. Such a viscosity reduction can also allow a further decrease in the level of reactive diluent, which can provide increases in certain thermal and mechanical properties. This use of these reactive diluents may have the advantages of lower ecotoxicity, less thermal degradation of the material in larger casts and shortened cycle times over epoxy systems that use other diluents.

Embodiments of the present invention disclose a method for limiting peak exotherm temperatures in an epoxy system. The method comprises the step of combining an amine hardener, an epoxy and a diluent to form an epoxy system.

The amine hardener of the present invention may include any amine hardener suitable for use in epoxy systems. Preferred amine hardeners include aliphatic amines having amine-hydrogen functionality greater than two amine hydrogens per molecule. In some embodiments the amine or amine blend can contain both a polyetheramine and a cycloaliphatic amine. In an embodiment, the amine blend can be of a commercially available polyetheramine such as JEFFAMINE® D-230 amine (commercially available from the Huntsman Corporation, JEFFAMINE is a registered trademark of Huntsman Corporation) and isophorone diamine. One skilled in the art, with the benefit of this disclosure will recognize suitable amine hardeners for use in the present invention.

The epoxy system of the present invention further comprises an epoxy. Common epoxies that are particularly useful are aromatic glycidyl ethers based upon bisphenol A and/or bisphenol F. The bisphenol A based epoxies are particularly economical and reactive enough to provide reasonable curing times with amine hardeners. In a preferred embodiment, the epoxy resins may consist of multifunctional polyglycidyl ethers of dihydric phenols. ARALDITE® PY 302-2 epoxy resin, a blend of Bisphenol A and Bisphenol F based resins, is a commercially available epoxy from the Huntsman Corporation of The Woodlands, Texas (ARALDITE is a registered trademark of Huntsman Corporation). One skilled in the art, with the benefit of this disclosure, will recognize other suitable epoxies for use in this invention.

Epoxy systems of the present invention further comprise a diluent. In an embodiment, the diluent may include ethylene carbonate, propylene carbonate, butylene carbonate, delta-valerolactam, delta-valerolactone, gamma valerolactone, butyrolactam, beta butyrolactone, gamma butyrolactone, and combinations thereof. In an embodiment, the diluent is propylene carbonate. In another embodiment, the diluent may include several other small cyclic compounds such as: butyrolactam (a.k.a. 2-pyrrolidinone), beta-butyrolactone, gamma-butyrolactam, delta-valerolactam, delta-valerolactone, gamma-valerolactone, and combinations thereof.

It is anticipated that in most cases, the preferred levels of diluents will be at levels of less than about thirty weight percent due to their effect in reducing the glass transition temperatures of the cured polymers. On the other hand, sufficient amounts of the compounds must be used in order to have enough to significantly decrease the exotherm temperature, thus it seems likely that levels greater than about two weight percent would be preferred.

Typical diluents used in epoxy systems are glycidyl ethers, such as diglycidyl ether of 1,4-butane diol (aliphatic) or phenyl glycidyl ether (aromatic). The diglycidyl ether of 1,4-butane diol is typically used as a diluent in wind blade applications. Embodiments of the present invention may replace a portion, if not all, of the glycidyl ether diluents with the diluents of the present invention. The use of diluents disclosed herein, in place of epoxy functional diluents, such as the diglycidyl ether of 1,4-butanediol, in composite wind blade formulations may allow a manufacturer to heat the epoxy system a little hotter without exceeding a desired exothermic temperature limit. This may also shorten cycle times for production of items such as wind blades.

In accordance with certain embodiments, the epoxy systems disclosed herein are substantially free of an aliphatic glycidyl ether diluent. As used herein the term "substantially free of an aliphatic glycidyl ether" or "substantially free of 1,4-butane diol" refers to epoxy systems that do not include any aliphatic glycidyl ether in the final composition, but may include minimal amounts of residual aliphatic glycidyl ether that is present in any remaining solvent or residual amounts of aliphatic glycidyl ether that leaches from any containers, molds or glassware used to synthesize and/or store the compositions. In certain examples, "substantially free of an aliphatic glycidyl ether" refers to an aliphatic glycidyl ether content of less than about 0.12% by weight total in the final epoxy system, more particularly less than about 0.09% by weight in the final epoxy system. Though residual amounts of aliphatic glycidyl ether may be present in the final epoxy system, the residual amount does not impart, or retract from, the physical properties, e.g., reduces the maximum exotherm temperature, increases the cured glass transition temperature of the epoxy system, etc. In addition, any residual amounts of aliphatic glycidyl ether that are present do not contribute appreciable amounts of toxic substances to be considered a health hazard.

Embodiments of the present invention further comprise the step of heating the epoxy system. The diluent-containing epoxy systems may have reduced exothermicity (i.e. those exhibiting lower peak exotherm temperatures), may be heated to higher initial temperatures, thus allowing for decreased amounts of diluents and/or higher molding temperatures with subsequent improvements in processing or thermal and/or mechanical performance. Any temperature suitable for molding that does not generate sufficient heat to cause problems such as outgassing, charring, discoloration, etc. is acceptable for embodiments of the present invention.

Embodiments of the present invention may further comprise the step of injecting, filling, or infusing the epoxy system into a mold. This mold may be for such articles of manufacture such as a wind blade.

In another embodiment of the present invention, epoxy systems may further comprise one or more reactivity agents. When compared to a system containing a similar level of propylene carbonate, the use of a reactivity agent such as glycerin carbonate adds a particularly short gel time and high exotherm temperature. For this reason, other carbonates, not known for exotherm reduction, such as glycerin carbonate, may also be used in the formulation as a means of adjusting reactivity. Other means of adjusting reactivity, such as addition of glycerin, N-aminoethyl piperazine, or other reactive amines, commonly known to those skilled in the art, may also be used in conjunction with the methods disclosed herein and are herein referred to as "reactivity agents."

In embodiments of the present invention, epoxy systems may further comprise one or more additives. Additives may comprise various processing aids, fillers, stabilizers, additives, adjuvants, and combinations thereof commonly used in curable epoxy formulations. One skilled in the art, with the benefit of this invention, will recognize other suitable additives for use with the present invention.

Embodiments of the present invention further teach an article of manufacture produced by the method described above. In an embodiment, the article of manufacture is a wind blade.

Embodiments of the present invention further teach the use of the method described above to produce a molded epoxy composite article. In an embodiment, the epoxy composite article is a composite blade used in the generation of electricity, particularly from the wind.

Embodiments of the present invention will be further illustrated by a consideration of the following examples, which are intended to be exemplary of the invention.

EXAMPLES

Example 1

When 200 g masses of an epoxy formulation, having 15% (resin side) of either propylene carbonate or diglycidylether of 1,4-butanediol as a diluent, and an amine curing agent containing a polyetheramine and a cycloaliphatic amine were allowed to react at room temperature, the peak exotherm temperatures measured near the center of the mass were 35° C. and 73° C., respectively. Obviously the use of propylene carbonate as a diluent can limit the exothermic temperature rise compared to the diglycidylether of 1,4-butanediol. In larger masses, such as those used in composite applications, the difference between the two maximum exotherm temperatures is expected to become even larger.

Example 2

FIG. 1 shows the temperature rise during gel time testing (200 g).

Focusing on the four curves on the right side of the FIGURE, they are stoichiometric mixtures of 1) bisphenol A/F epoxy resin, 2) an amine blend (20 wt. % isophorone diamine (IPDA) +80 wt. % polyetheramine (from Huntsman Corporation under the designation XTJ-678) and 3) either propylene carbonate (PC) or diglycidyl ether of 1,4-butanediol diluents (DY-D). The weight percentage diluent levels, based on the diluent plus the epoxy resin, are shown in the boxes in the FIGURE. In particular, the lines with the hollow diamond and hexagonal data points have respectively 10% and 5% by weight PC. The lines with the hollow triangle and square data points have respectively 10% and 5% by weight DY-D. Note that at both usage levels, the peak temperatures of the DY-D containing formulations exceed those of either of the PC containing formulations. The curve at the left with the solid circle data points is of a generally similar formulation except it contains ten weight percent in the resin of glycerin carbonate (GC). The great exotherm temperature is due to the faster reaction caused by catalysis of the epoxide-amine reaction by the hydroxyl group of the glycerin carbonate. Thus this carbonate might be used in admixture with other diluents to speed curing and increase exotherm temperatures when such increases pose no problems.

Although the present invention and its advantages have been described in detail, it should be understood that various changes, substitutions and alterations may be made herein without departing from the spirit and scope of the invention as defined by the appended claims.

What is claimed is:

1. A method for limiting peak exotherm temperatures in an epoxy system comprising the steps of:
    forming an epoxy system consisting of an epoxy resin that is an aromatic glycidyl ether based upon a mixture of bisphenol A and bisphenol F, polyetheramine, a cycloaliphatic amine and 2% by weight up to 10% by weight of a diluent and a reactive agent selected from the group consisting of glycerin carbonate, glycerin and a mixture thereof and optionally an additive selected from the group consisting of: a filler, a stabilizer, and a mixture thereof where the % by weight is based on the total weight of the epoxy system, and
    wherein the diluent is selected from the group consisting of: ethylene carbonate, propylene carbonate, butylene carbonate and combinations thereof and wherein the epoxy system is substantially free of an aliphatic glycidyl ether.

2. The method of claim 1, wherein the diluent is propylene carbonate.

3. The method of claim 1, wherein the cycloaliphatic amine is isophorone diamine.

4. The method of claim 1, wherein the diluent is present in an amount of 2% by weight to 5% by weight, based on the total weight of the epoxy system.

5. A method to produce a molded epoxy composite article comprising:
    forming an epoxy system consisting of an epoxy resin that is an aromatic glycidyl ether based upon a mixture of bisphenol A and bisphenol F, polyetheramine, a cycloaliphatic amine and 2% by weight up to 10% by weight of a diluent and a reactive agent selected from the group consisting of glycerin carbonate, glycerin and a mixture thereof and optionally an additive selected from the group consisting of: a filler, a stabilizer, and a mixture thereof where the % by weight is based on the total weight of the epoxy system and wherein the diluent is selected from the group consisting of: ethylene carbonate, propylene carbonate, butylene carbonate and combinations thereof and wherein the epoxy system is substantially free of an aliphatic glycidyl ether;

injecting, filling or infusing the epoxy system into a mold; and heating the epoxy system.

6. The method of claim 5, wherein the epoxy composite article comprises a composite blade.

7. The method of claim 5, wherein the peak exotherm temperature of the epoxy system is less than 160° C. during heating.

8. An epoxy composite article produced according to the method of claim 5.

9. The epoxy composite article of claim 8, wherein the epoxy composite article is a wind blade.

* * * * *